United States Patent
Ofek

(10) Patent No.: US 11,147,270 B2
(45) Date of Patent: Oct. 19, 2021

(54) PESTICIDE BASED ON FORMATION OF FORMATE ANION IN SITU

(71) Applicant: AGROMETIX LTD., Rosh Haayin (IL)

(72) Inventor: Ido Eco Ofek, Moshav Luzit (IL)

( * ) Notice: Subject to any disclaimer, the term of this patent is extended or adjusted under 35 U.S.C. 154(b) by 27 days.

(21) Appl. No.: 16/666,444

(22) Filed: Oct. 29, 2019

(65) Prior Publication Data

US 2020/0060270 A1     Feb. 27, 2020

Related U.S. Application Data

(63) Continuation-in-part of application No. PCT/IL2019/050131, filed on Feb. 4, 2019.

(60) Provisional application No. 62/712,996, filed on Aug. 1, 2018.

(51) Int. Cl.
    *A01N 37/02*       (2006.01)
    *A01N 25/30*       (2006.01)
    *C05G 3/60*        (2020.01)

(52) U.S. Cl.
    CPC ............ *A01N 37/02* (2013.01); *A01N 25/30* (2013.01); *C05G 3/60* (2020.02)

(58) Field of Classification Search
    CPC ........... A01N 37/02; A01N 25/30; C05G 3/60
    USPC ....................................................... 514/557
    See application file for complete search history.

(56) References Cited

U.S. PATENT DOCUMENTS

| | | |
|---|---|---|
| 8,715,704 B2 | 5/2014 | Skelton et al. |
| 2011/0135750 A1 | 6/2011 | Bylemans |
| 2011/0319435 A1 | 12/2011 | Saalfeld et al. |

FOREIGN PATENT DOCUMENTS

| | | | |
|---|---|---|---|
| DE | 60217491 | 10/2007 | |
| DE | 102006045505 | 4/2008 | |
| EP | 2153720 | 2/2010 | |
| EP | 2153720 A1 * | 2/2010 | ........... A01N 43/653 |
| EP | 3028569 | 6/2016 | |
| EP | 3028569 A1 * | 6/2016 | ............. A01N 37/02 |
| WO | 2003020027 | 3/2003 | |
| WO | 2009055632 | 4/2009 | |
| WO | WO-2009055632 A2 * | 4/2009 | ............. A01N 37/02 |
| WO | 2013191312 | 12/2013 | |
| WO | WO-2013191312 A1 * | 12/2013 | ............. A01N 37/02 |

\* cited by examiner

*Primary Examiner* — Deborah D Carr

(57) ABSTRACT

A pesticide formulation preserves an effective concentration of an active form over time. For example, the active form may be generated over time as it is removed from the system. For example, Calcium Formate may be transformed to an active form of Formic Acid. For example, modulator such as citric acid may facilitate driving the generative reaction forward, for example by removing Calcium form the solution. Optionally Boric acid may be added to the formulation. The formulation may be applied dry and/or wet to the organisms and/or their living space.

16 Claims, 5 Drawing Sheets

Figure 1:
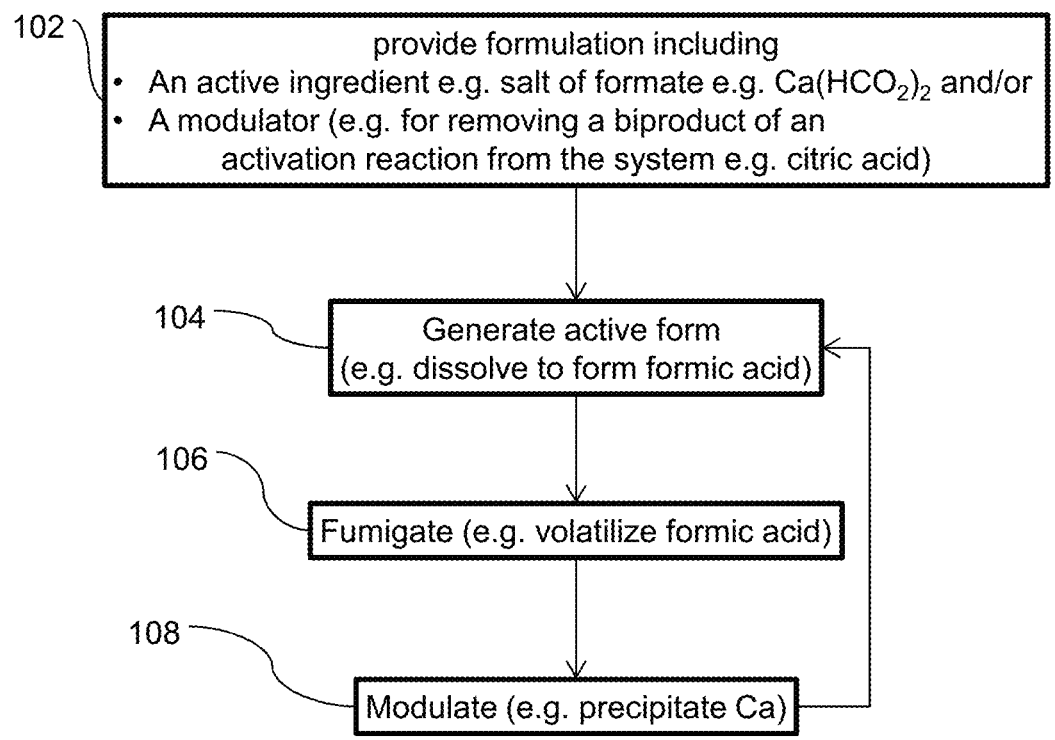

102 — provide formulation including
- An active ingredient e.g. salt of formate e.g. $Ca(HCO_2)_2$ and/or
- A modulator (e.g. for removing a biproduct of an activation reaction from the system e.g. citric acid)

104 — Generate active form (e.g. dissolve to form formic acid)

106 — Fumigate (e.g. volatilize formic acid)

108 — Modulate (e.g. precipitate Ca)

$$2C_6H_8O_{7(s)} + CaCl_{2(s)} + 2Ca(HCO_2)_{2(s)} + 6H2O_{(l)}$$

$$\longrightarrow 2C_6H_5O_7^{3-}{}_{(aq)} + 3Ca^{2+}{}_{(aq)} + 3Cl^-{}_{(aq)} + 6H_3O^+ + 4(HCO2)^-$$

$$\longrightarrow Ca_3(C_6H_5O_7)^2{}_{(s)} + 4HCO_2H_{(aq)} + 2HCl_{(aq)}$$

PESTICIDE BASED ON FORMATION OF FORMATE ANION IN SITU

RELATED APPLICATION/S

This application is a Continuation in Part of PCT Patent Application No. PCT/IL2019/050,131 having International filing date of 4 Feb. 2019, which claims the benefit of priority of U.S. Provisional Patent Application No. 62/712,996 filed 1 Aug. 2018, the contents of which are incorporated herein by reference in their entirety.

FIELD AND BACKGROUND OF THE INVENTION

The present invention, in some embodiments thereof, relates to a pesticide and, more particularly, but not exclusively, to a pesticide formulation including Calcium Formate.

U.S. Pat. No. 9,518,013 appears to disclose, "peroxyformic acid forming compositions, methods for forming peroxyformic acid, preferably in situ, using the peroxyformic acid forming compositions. The present invention also relates to the peroxyformic acid formed by the above compositions and methods. The present invention further relates to the uses of the peroxyformic acid, preferably in situ, for treating a surface or a target. The present invention further relates to methods for treating a biofilm using peroxyformic acid, including peroxyformic acid generated in situ."

US published patent application no. US20100056630 appears to disclose, "an agent for treating and/or preventing of fire blight, especially in woody plants and preferably orchard irrigation containing formic acid and/or a salt of formic acid, in particular calcium as active ingredient. Further, the use of formic acid and/or a salt of formic acid, in particular calcium as an active ingredient of pesticides is particularly for the treatment and/or prevention of fire blight, and the use of formic acid and/or a salt of formic acid, in particular calcium for the production of a reveals agent for the treatment and/or prevention of fire blight."

US published patent application no. 20110135750 appears to disclose, "certain combinations of alkaline earth metal salts and rare earth metal salts which provide an improved denaturing effect on allergens. More particularly, the present invention relates to compositions comprising a combination of calcium salts and lanthanum salts in respective proportions to produce a synergistic denaturing effect on allergens. Compositions comprising these combinations are particularly effective for use in an ex vivo method for denaturing allergens associated with house dust mites and other common allergens such as cat dander, molds, cockroach, pollen and the like."

Additional background art includes International published patent application WO2003020027, US published patent application 20040261961, European patent no. EP2242358 and U.S. Pat. No. 8,715,704, Technical Evaluation Report, Formic Acid, Jun. 1, 2011 Compiled by ICF International for the USDA National Organic Program, U.S. Department of Agriculture, 1400 Independence Ave., S.W. Washington, D.C. 20250.

SUMMARY OF THE INVENTION

According to an aspect of some embodiments of the invention, there is provided a pesticide formulation including: a stable inert compound of an active ingredient configured for generating an active form that at an effective concentration that is safe for mammals over a medium term and a moderator compound that tends to drive the generating forward as the active form is depleted below the effective concentration.

According to some embodiments of the invention, the generating an active form produces a byproduct and wherein the moderator compound includes a component that tends to remove the byproduct from a system.

According to some embodiments of the invention, the moderator compound and the byproduct form a precipitate at a concentration of the pesticide formulation that generates an effective concentration of the active form.

According to some embodiments of the invention, the active ingredient includes formate.

According to some embodiments of the invention, the stable inert compound is a salt of the active ingredient and a cation.

According to some embodiments of the invention, the active form is volatile to form a vapor that acts as a fumigant to destroy a pest at an effective concentration.

According to some embodiments of the invention, the vapor from the effective concentration produces the vapor at a concentration that is safe for human beings.

According to some embodiments of the invention, the vapor from the effective concentration produces the vapor at a concentration that is safe for mammals.

According to some embodiments of the invention, the stable inert compound includes at least 10% by weight Calcium Formate.

According to some embodiments of the invention, the moderator includes Citric acid at least 15% by weight of the total pesticide formulation.

According to some embodiments of the invention, a molar ratio of the Citric acid to the Calcium Formate ranges between ½ to 2.

According to some embodiments of the invention, the moderator includes at least 5% by weight Calcium Chloride.

According to some embodiments of the invention, a molar ratio of the Calcium Chloride to the Calcium Formate ranges between 15% to 100%.

According to some embodiments of the invention, the active form is an acid having a pH of between 3 and 7 at the effective concentration.

According to some embodiments of the invention, the pesticide formulation further includes: boric acid at a weight ratio to the active ingredient of between 1/10 to 10.

According to some embodiments of the invention, the formulation is configured as a disinfectant.

According to some embodiments of the invention, the formulation is configured as an antibacterial agent.

According to some embodiments of the invention, the formulation is configured for disinfecting *Salmonella, Listeria* and *Bacillus* species.

According to an aspect of some embodiments of the invention, there is provided a method of controlling pests including spreading a dry formulation according to any one of claims 1 to 15 at a rate of 1 to 500 g/m2 around a mammal living space.

According to some embodiments of the invention, the method further includes wetting the living space after the spreading with water at a quantity of between 10 to 1,000 cc/m2.

According to an aspect of some embodiments of the invention, there is provided a method of controlling pests including spreading a dry formulation according to any one of claims 1 to 15 on a planted area at a quantity of between 1 to 500 g/m2.

According to some embodiments of the invention, the method further includes wetting the planted area after the spreading with water at a quantity of between 10 to 1,000 cc/m2.

According to an aspect of some embodiments of the invention, there is provided a method of controlling pests including adding the formulation to water at a concentration ranging between 1/10% to 10% of the active ingredient of the above embodiments and spreading onto a mammal.

According to an aspect of some embodiments of the invention, there is provided a method of controlling pests including adding the formulation to water at a concentration ranging between 0.1 to 10% of the active ingredient according to any of the above embodiments and spreading onto a living space of a mammal at a rate of between 1 to 1,000 cc/m2.

According to an aspect of some embodiments of the invention, there is provided a method of controlling pests including adding the formulation to water at a concentration ranging between 0.1 to 10% of the active ingredient according to any of the above embodiments and spreading onto a plant.

According to an aspect of some embodiments of the invention, there is provided a method of controlling pests including adding the formulation to water at a concentration ranging between 0.1 to 10% of the active ingredient according to any of the above embodiments and spreading onto a planted area at a rate of between 1 to 1,000 cc/m2.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flow chart illustration of a method of fumigating in accordance with the current invention;

FIG. 2 is an illustration of states of a pesticide in accordance with an embodiment of the current invention;

FIG. 3 is an illustration of formulating a compound pesticide in accordance with an embodiment of the current invention;

FIG. 4 is an illustration of states of a compound pesticide in accordance with an embodiment of the current invention;

FIG. 5 is a formula for a fumigation reaction of an active pesticide formulation in accordance with an embodiment of the current invention;

FIG. 6 is a flow chart illustration of a method of fumigating with a dry formulation in accordance with the current invention;

FIG. 7 is a flow chart illustration of a method of fumigating with a wet formulation in accordance with the current invention;

FIG. 8 is an illustration of sampling in an experimental test of a pesticide in accordance with an embodiment of the current invention; and FIG. 9 is an illustration of experimental results of a pesticide test in accordance with an embodiment of the current invention.

DESCRIPTION OF SPECIFIC EMBODIMENTS OF THE INVENTION

The present invention, in some embodiments thereof, relates to a pesticide and, more particularly, but not exclusively, to a pesticide formulation including Calcium Formate.

Overview

An aspect of some embodiments of the current invention relates to a pesticide formulation that forms formic acid in situ. In some embodiments, a chemical reaction may preserve a preferred concentration of formic acid over time as products of the reaction decay over time. For example, the reaction may retain an effective concentration of formic acid (for example between 0.01 to 0.1% W/W and/or between 0.1 to 1.0% and/or between 1% to 5% and/or between 5 to 25% and/or between 25 to 75%) over a relatively long period of time (for example between 1 minute to 1 hour and/or between 1 hour to 24 hours and/or between 1 day to 7 days and/or between 7 days to 30 days and/or between 30 days to 3 months and/or between 3 months to 1 year). Exposure to such a concentration over such a period may be safe for some animals, for example mammals and/or bees but effective to destroy some pests (for example various invertebrates such as mites and/or fleas and/or various arthropods etc.) and/or serve as a disinfectant.

In some embodiments, a dry formulation is supplied including Calcium Formate (alternatively or additionally, potassium formate, sodium formate, potassium diformate, sodium diformate, double salts of potassium formate and/or sodium formate with formic acid) and/or one or more modulating agents. For example, modulating agents may include for example Citric acid (alternatively or addition an acid for example a weak acid, an organic acid, Formic acid, alkali metal diformates, ammonium salts, propionic acid, lactic acid, tartaric acid, malic acid and/or succinic acid) and/or Calcium chloride (alternatively or additionally for example inorganic salts such as, for example, calcium nitrate, hygroscopic chemicals and/or humectants for example, organic substances such as, for example, glycerol, polydextrose, sorbitol, xylitol, propylene glycols, polyethylene glycols or mixtures of these polyols). Optionally, the modulating agents facilitate generation of formate ion as the ion is removed from solution and/or preserve solubility of the formate. For example, the dry formulation may be mixed in water at a concentration ranging between 0.01% to 0.1% and/or 0.1% to 1% and/or between 1% to 5% and/or between 5% to 25%. Optionally Calcium citrate may precipitate.

In some embodiments, a dry formulation includes molar ratios of Calcium chloride, Calcium formate and/or Citric acid of approximately 1 to 2 to 2 for example 1±0.5 to 2±1 to 2±1. Optionally the dry formulation may be used directly, for example around areas where pests multiple and/or live part of their lifecycle. In some embodiments, the formulation is mixed with water. Under some conditions, (for example in a closed system with 2.5% concentration of pesticide at 25 degrees C.), when added to water, the formulation tends to preserve an equilibrium concentration of Formate ion of concentration weight to weight, for example between 0.0001% to 0.01% and/or between 0.01% to 0.1% and/or between 0.1% to 1% and/or between 1% to 10%. Under some conditions (for example in a closed system with 2.5% concentration of pesticide at 25 degrees C.), when added to water, the formulation tends to preserve an equilibrium concentration of Citric acid of concentration weight to weight, for example between 0.0001% to 0.01% and/or between 0.01% to 0.1% and/or between 0.1% to 1% and/or between 1% to 10%. Under some conditions (for example in a closed system with 2.5% concentration of pesticide at 25 degrees C.), when added to water, the formulation tends to preserve an equilibrium concentration of Hydrochloric acid of concentration weight to weight, for example between 0.0001% to 0.01% and/or between 0.01% to 0.1% and/or between 0.1% to 1% and/or between 1% to 10%. Optionally, in an open system (for example when the dissolved mixture is used to treat plants animals and/or other areas exposed to air) the reaction will proceed and keep a concentration of Formate ion between 0.0001% to 0.01% and/or between 0.01% to 0.1% and/or between 0.1% to 2% and/or between 2% to 10% even as Formate is removed from the system (for example by volatilization). Optionally, the pH of a pesticide formulation may tend towards a range between 0.1 to 2 and/or between 2 to 4 and/or between 4 to 6 and/or between 6 to 7.

An aspect of some embodiments of the current invention relates to a pesticide formulation including an acidic mixture with boric acid. For example, the pH of the mixture may range between 0.1 to 2 and/or between 2 to 4 and/or between 4 to 6 and/or between 6 to 7. In some embodiments, the acidity of the mixture preserves a solubility of the boric acid of between 0 to 1% and/or between 1 to 3% and/or between 3 to 5% and/or between 5 to 10% and/or between 10 to 25% and/or between 25 to 50% and/or between 50 to 80%. For example, the mixture may include hydrochloric acid. Alternatively or additionally, the mixture may include an acidic pesticide (for example formic acid). Optionally, a reaction may continue in an open system preserving the pH and/or concentration some of the products even as some components are removed from the system. In some embodiments, the Boric acid and another pesticide (for example formic acid) combined are more effective and/or are less vulnerable to acquired resistance than either individual substance.

An aspect of some embodiments of the current invention relates to a pesticide formulation that generates a pesticide over time. For example, the active form of the pesticide may be generated by an activation reaction. For example, activation reaction may produce the active form of the pesticide and/or one or more byproducts. Optionally the active form of the substance is removed from the system over time. For example, the active form of the active substance may decay over time and/or may volatilize. Optionally, the formation also includes a substance that removes byproducts of the activation reaction. For example, a reaction may occur that causes the byproducts to be precipitated out of the system. As the active form and the byproduct leave the system, the activation reaction is optionally driven forward replenishing the active form of the pesticide.

In some embodiments, the pesticide formulation includes a salt of the active ingredient and an acid. For example, the acid may include an anion that removes the cation of the salt of the active substance (for example by precipitation). For example, as the salt of the active substance dissolves, the active substance forms an acid which leaves the system by volatilization. The volatilization of the acid optionally fumigates and/or destroys sensitive pests. Additionally or alternatively, the acid itself in its active and/or aqueous form may destroy sensitive pests. In some embodiments, the active ingredient is kept at a concentration that is safe for mammals and/or for human beings over a short and/or medium term. As the active form of the active ingredient and/or the cation of the active salt is removed from the system, the activation reaction is driven forward replenishing the active form of the active ingredient and/or preserving an effective concentration of the active form of the pesticide and/or avoiding undesirably high concentration of the active pesticide. Optionally the formulation is configured that in foreseeable circumstances it will not produce dangerous circumstances while being stored. For example, the formulation may be configured so that it does not produce dangerous concentrations of formic acid even when highly concentrated in water. For example, in an open environment, the rate of generation of formic acid may be balanced by the rate of volatilization. For example, in a closed environment, the equilibrium concentration of formic acid is less than a dangerously high concentration.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

FIG. 1 is a flow chart illustration of a method of fumigating 106 in accordance with the current invention. In some embodiments a pesticide formulation is provided 102 including an active ingredient (for example Calcium Formate) and a modulator (for example Calcium Citrate). Optionally, the active ingredient is provided in an inert and/or stable form. For example, in the stable form, the active ingredient may be safe for handling. In use, an active form of the active ingredient is optionally generated 104 for example by an activation reaction. For example, water may be added to a formulation including Calcium Formate for example to form Formic acid. The active form of the pesticide may be used to fumigate an area and/or host. For example, Formic acid may volatilize and/or kill pests for example fleas and/or mites. In some embodiments, the active ingredients will be modulated 108, for example to maintain the effective concentration of the active form of the active ingredients. For example, a modulator compound may facilitate generation 104 of an active form of the active ingredient. For example, modulation may include removing from the system a byproduct of the generation 104 of the active form to facilitate the activation reaction to move forward. For example, using Calcium Formate as an active ingredient, a modulator may include Citric acid which may react with the Calcium in solution to form a Calcium Citrate precipitate and/or to remove Calcium from solution. Removing Calcium from the solution may facilitate further dissolution of the Calcium Formate preserving an effective concentration of Formic acid as some of the Formate volatilizes.

In some embodiments, generating 104 an active form may include exposing the inert form to an activator. For example, Calcium Formate may be dissolved in water, at least a portion of the active ingredient is transformed into an active form (e.g. Formic acid). Alternatively or additionally, generating 104 an active form may include exposure to air, light, heat, a catalyst, a solvent (e.g. water, alcohol, an organic solvent, a surfactant etc.).

In some embodiments, modulation 108 may include facilitating generation 104 of an active form for example to keep up a concentration when the active form is lost over time (for example due to decay and/or dilution and/or volatilization). Alternatively or additionally, modulation 108 may include inhibiting generation and/or removing an active form from the system, for example to prevent concentration from increasing beyond a safe and/or effective value. Alternatively or additionally, modulating 108 may include controlling various factors that affect the equilibrium concentrations of the transformation. Alternatively or additionally, modulating 108 may include controlling rates of reactions.

In some embodiments, the pesticide formulation is applied at a high enough rate to preserve the effective concentration over an extended short term of between 1 to 24 hours (for example for between 1 to 6 hours and/or between 6 to 24 hours) and/or over a medium term of between 1 day to a month (for example between 1 day to a week and/or between a week to a month) and/or over a long term of between a month and a year or more (for example between a month to a three months and/or between three to six months and/or between six months to a year and/or more). In some embodiments, the effective concentration is kept for at least 50% of the period (for example over between 50 to 80% and/or between 80% to 100% of the period) and/or intermittently for less than 50% of the period (for example between 0.1 to 5% and/or between 5 to 10% and/or between 10 to 20% and/or between 20 to 50% of the period).

In some embodiments, a stable pesticide formulation may include an active ingredient between 1 to 10% by weight and/or between 10 to 30% and/or between 30 to 60% and/or between 60 to 100%.

In some embodiments, a stable pesticide formulation may include a modulator ingredient between 1 to 10% by weight and/or between 10 to 30% and/or between 30 to 60% and/or between 60 to 100%.

Figure 2:
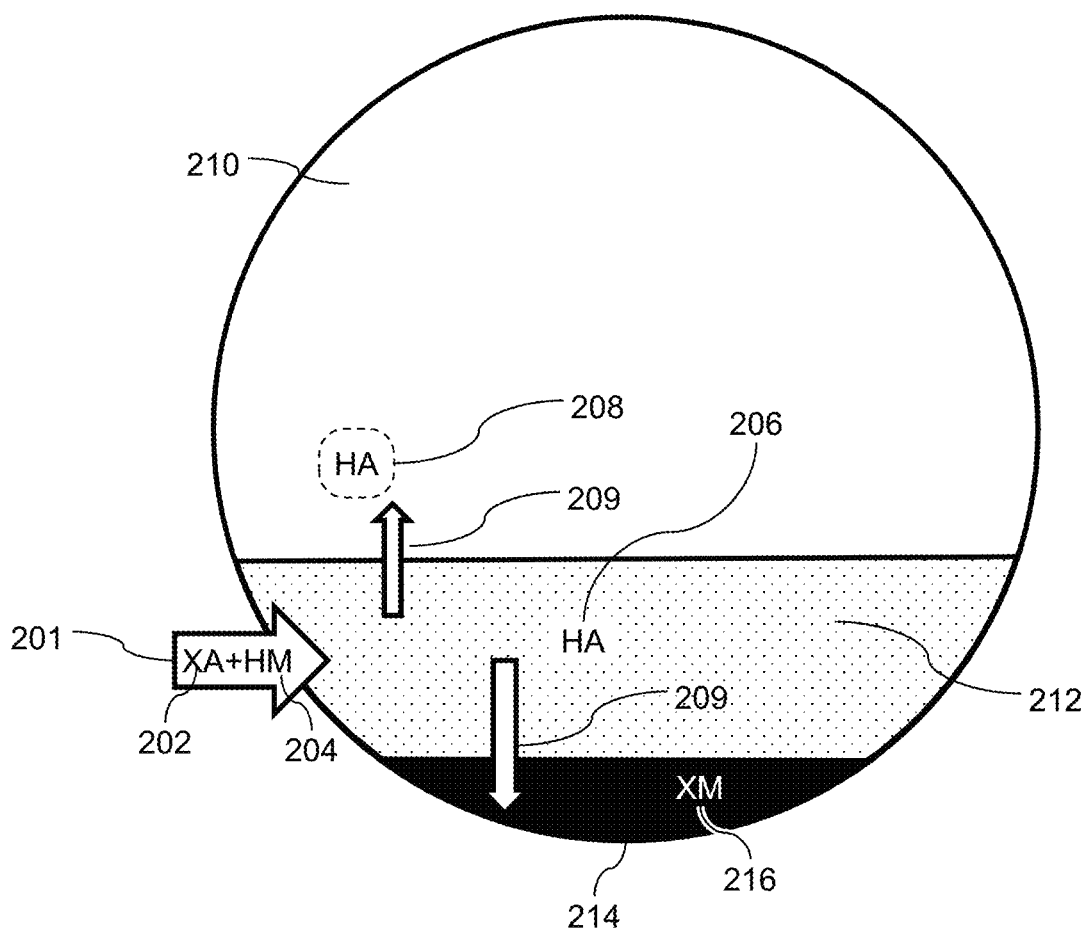

FIG. 2 is an illustration of phases of a pesticide in accordance with an embodiment of the current invention. In some embodiments, a pesticide may be distributed between various forms and/or states. Optionally, a quantity of an active state will be preserved in balance with the stable state. Optionally a modulator will take part in preserving the effective concentration. For example, the modulator may preserve a desired balance between the active and/or stable states. In some embodiments, there may be an active state 208 of the formulation (for example an aqueous phase 212) where different forms of the formulation are being generated and/or transformed. Additionally or alternatively, there may be one or more passive states that act as drains of material. For example, material may be lost to a solid phase 214 (for example a precipitate) which is lost from the system and/or material may be lost to a gas phase 210 (e.g. by volatilization). For example, the volatilized 208 material may be carried away from the system by dispersion and/or convection.

In some embodiments, a stable form of a pesticide formulation 201 may include an active ingredient 202 for example a salt of an anion (for example formate). For example, the salt may be safe to handle and/or the anion may have pesticidal properties in some forms. Optionally the formulation 201 may also include a modulating substance 204. For example, the active ingredient 202 may include Calcium Formate and/or the modulating substance 204 may include Citric acid.

In some embodiments, the formulation 201 is activated, for example by dissolving into an aqueous phase 212 wherein a portion of the active ingredient 202 is transformed to an active form 206. For example, in the aqueous phase 212 the active form may be generated for example by hydrolyzation to an active form 206. For example, the active form 206 may include Formic acid. In some embodiments, preservation of an effective concentration of the active form is facilitated by the modulating substance 204. For example, an active form 206 may be lost from the aqueous phase 212 by volatilization 209. Optionally, the modulating substance 204 preserve the concentration of the active form 206 by facilitating generation of the active form, for example by removing a byproduct of the generation from the aqueous phase. For example, citric acid a may react with Calcium cations to remove the Calcium ions from solution (for example by combining to form a precipitate 216 that falls out of solution to a solid phase 214). Removing the byproduct optionally facilitates the activation reaction e.g. driving the activation reactions towards its products.

In some embodiment the pesticide formulation may include between 1 to 10% and/or 10 to 30% and/or 30 to 50% and/or 50 to 75% and/or 75 to 100% of its active ingredient. In some embodiment the pesticide formulation may include between 1 to 10% and/or 10 to 30% and/or 30 to 50% and/or 50 to 75% of a moderator ingredient. In some embodiments, an aqueous phase of a pesticide may have a pH of between 1 to 3 and/or between 3 and 7 at the effective concentration.

Figure 3:
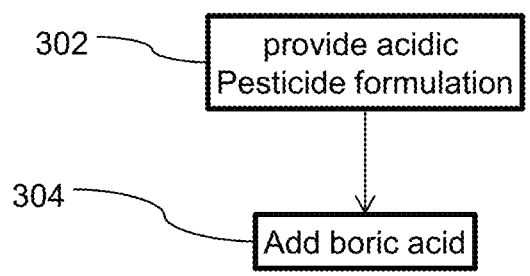

FIG. 3 is an illustration of formulating a compound pesticide in accordance with an embodiment of the current invention. In some embodiments, Boric acid 304 may be added to a pesticide formulation 302. For example, when the pesticide formulation may increase the effectiveness of the Boric acid. For example, the formulation may increase the solubility of Boric acid. For example, an acidic pesticide formation may increase the solubility and/or effectiveness of Boric acid as a pesticide. For example, Boric acid may be added to a pesticide formulation having a pH ranging between 7 to 6.5 and/or between 6.5 to 5 and/or between to 5 to 3 and/or between 3 to 1 and/or below. Optionally a solid form (e.g. power) of the pesticide and/or the boric acid is supplied to users.

In some embodiment an addition to a pesticide formulation may increase the toxicity to pests much more than to mammals. For example, without limiting the patent to a certain theoretical reasoning, a substance which is removed from mammals by the kidneys may accumulate in invertebrates. Optionally such a toxin may be added to a pesticide formulation. For example, Boric acid may have a much higher toxicity to arthropods and/or invertebrates that to humans and other mammals. Optionally, between 10 to 30% boric acid by weight will be added to a pesticide formation and/or between 0.1 to 1% and/or between 1 to 10% and/or between 30% to 50% and between 50 to 75% and/or between 75 to 90%. For example, Boric acid may be added to formulations in accordance with embodiments listed herein.

Figures 4, 5:
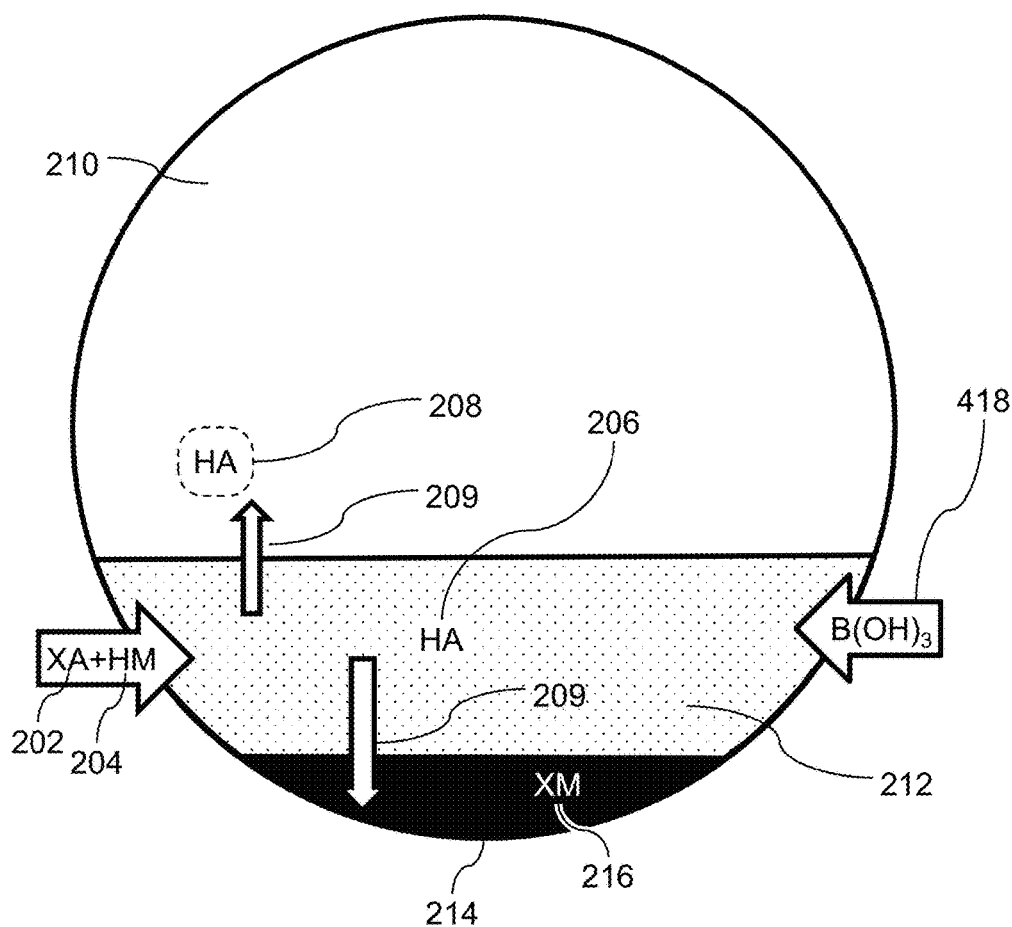

FIG. 4 is an illustration of states of a compound pesticide in accordance with an embodiment of the current invention. Optionally, an additional toxin may be added to a pesticide formulation as described herein above. For example, the extra toxin 418 may include boric acid.

FIG. 5 is a formula for a fumigation reaction of an active pesticide formulation in accordance with an embodiment of the current invention. Without limiting the invention to a theoretical framework, a pesticide may include a formulation that includes a mixture of solid chemicals that release hydrochloric acid and/or Formic acid. For example, the dry chemicals may be mixed with water and/or undergo a hydration reaction. Optionally, the products of this chemical reaction destroy arthropods and/or disinfect bacteria, fungi etc.

In some embodiments the formulation includes a mixture of: Citric acid ($C_6H_8O_{7(s)}$), Calcium chloride ($CaCl_2$) and/or Calcium format ($Ca(HCO_2)_{2(s)}$). Optionally the mixture is highly hygroscopic and/or chemically activated by contact with water and/or air or soil from the environment. For example, some or all of the following reactions may occur:

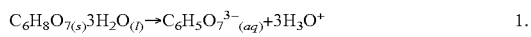    1.

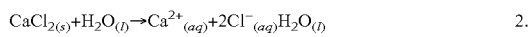    2.

    3.

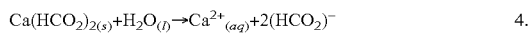    4.

The above reactions may be described in words as follow:

1. In some embodiments, Citric acid is dissolved in water forming hydronium cations and citrate anions, the ions are optionally dissolved in the water medium.

2. In some embodiments, calcium chloride is dissolved in water forming calcium cations and/or chloride anion. Optionally, the ions are dissolved in the water medium.

3. In some embodiments, chemical reaction between calcium cations and/or citrate anions forms an insoluble solid. For example, Calcium Citrate salt with a solubility of for example approximately 0.95 g/L at 25° C. The salt optionally exits the system for example precipitating and/or sinking.

4. In some embodiments, Calcium Format is dissolved in water forming calcium cation (Calcium), and formate anion (Formate). The ions are optionally dissolved in the water medium.

In some embodiments, dissolved: chlorine anions, hydronium cations, formate anions form hydrochloric acid and/or formic acid and/or boric acid, and/or undissolved: calcium citrate. In some embodiments, the vapor pressure of the formic acid may be approximately 35 mmHg (at 20° C.), and/or the vapor pressure of hydrochloric acid may be approximately 32452 mmHg (20° C.). The volatility of the HCl may result in some of it exiting the system by vapors. An overview of an exemplary reaction is illustrated in FIG. 5.

In accordance with the molecular relationship, two units of citric acid may react with one unit of calcium chloride and/or two units of calcium format, depending on the molecular mass. For example, the following relationship may be followed:

| Weight ratio W/W | Molar ratio | Molar mass | Chemical |
|---|---|---|---|
| 14.7% | 1 | 110.98 g/mol | Calcium chloride |
| 34.5% | 2 | 130.113 g/mol | Calcium format |
| 50.8% | 2 | 192.12 g · mol$^{-1}$ | Citric acid |

In some embodiments, the formulation may produce Formic acid which may be used as a disinfectant (for example against bacteria and/or fungi) and/or pesticide (for example against mites and/or fleas). The concentrations of Formic acid resulting from the formulation may be safe for use in the presence of some creatures. For example, mammals and/or humans and/or bees.

Additionally or alternatively, the formulation may include Boric acid ($B(OH)_3$). For example, the Boric acid may undergo the following reaction:

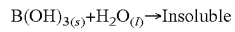    5.

In some embodiments, Boric acid is added to the formulation. Optionally the Boric acid may not be involved in the chemical reactions with the Formate. The presence of other ingredients of the formulation may optionally amplify its arthropodicidal and/or disinfectant characteristics. For example, the presence the hydrochloric acid, may increase the solubility of the Boric acid in the water medium.

For example, in order to amplify the efficiency of the arthropodicidal and disinfectant ability of the chemical mixture, boric acid may be added for example at a ratio of 2%-50% W/W.

In some embodiments, a pesticide of a formulation in accordance with any of the embodiments above may be supplied in a dry form. For example, the dry form may be spread around an area and/or on an animal and/or to on a plant. Optionally the dry formula may be left to take affect directly and/or in contact with pests and/or after interacting with environmental water. Alternatively or additionally, after application of the dry formula, water may be applied for example to activate the pesticide. Alternatively or additionally, the dry formula may be added to water and applied around an area and/or to an animal and/or to a plant in a wet form. For example, some modes and/or quantities of application are described herein below. Optionally, a combination of treatments may be used according to what is being protected and the pest that is being attacked. For example, depending on the lifecycle of a pest, various treatments may be used to interrupt different stages of the life cycle. For example, for lifecycle stages where a pest is in the environment, the pesticide may be applied to the environment. For stages where the pest is inactive and/or protected from the environment, the pesticide may be applied in a longer lasting form and/or in a stronger form and/or in a form configured to penetrate protection. For stages where the pest is on a host and/or in a more sensitive condition pesticide may be applied in a limited way.

Figure 6:
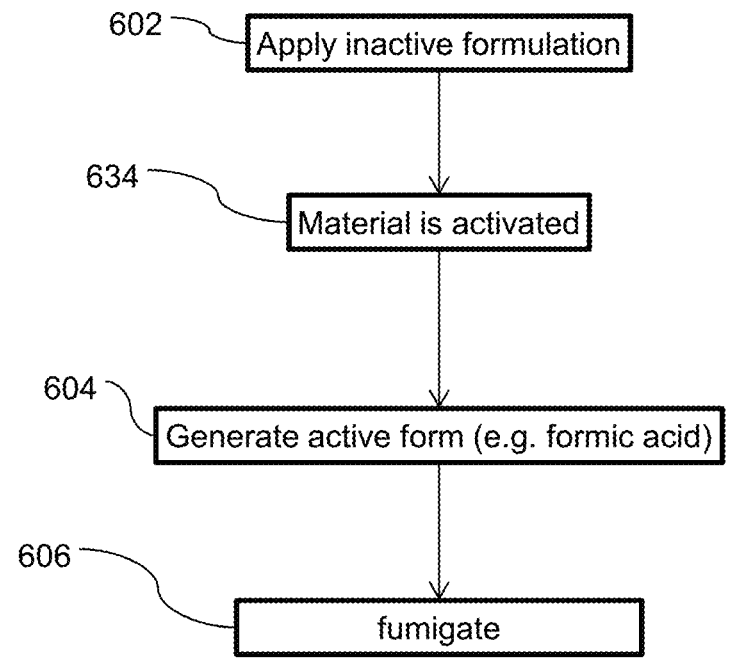

FIG. 6 is a flow chart illustration of a method of fumigating with an inactive formulation in accordance with the current invention, for example as described in any of the embodiments herein. In some, embodiments the inactive formulation may include a dry formulation. Optionally, the inactive formulation may be safe for storage and/or some animals and/or people. For example, in some embodiments the inactive formation may be applied 602 various regions and/or surfaces including animals, plants, food, living spaces and/or people. Alternatively or additionally, the inactive formulation may be applied 602 to an area which is protected from animals, plants, food or people. For example, the inactive dry formulation may be applied 602 at a rate of between 0 to 1 g/m$^2$ and/or between 1 to 50 g/m$^2$ and/or between 50 to 150 g/m$^2$ and/or between 150 to 500 g/m$^2$ and/or between 500 to 2,000 g/m$^2$. Optionally application 602 may be according to the quantity of the active ingredient. For example, the active ingredient may be applied 602 at a rate of between 0 to 1 g/m$^2$ and/or between 1 to 20 g/m$^2$ and/or between 20 to 100 g/m$^2$ and/or between 100 to 300 g/m$^2$ and/or between 300 to 1,000 g/m$^2$. Optionally, application 602 may be at a fixed time and/or time intervals. Alternatively or additionally the time of application 602 may be related to the lifecycle of the pest being eradicated. Alternatively or additionally, time of application 602 may be at a certain time and/or interval related to the lifestyle of the organism being protected.

In some embodiments, after applying 602 an inactive formulation, an activating 634 process may be applied the application region and/or surface where the pesticide was applied 602. For example, water may be applied at a rate of between 1 to 10 $cc/m^2$ and/or between 10 to 100 $cc/m^2$ and/or between 100 to 500 $cc/m^2$ and/or between 500 to 2,000 $cc/m^2$ and/or more to an area where a dry formulation was applied 602. Activation may optionally include applying water and/or other materials and/or energy. For example, activation 634 optionally includes exposure to light, air, heat, an organic solvent and/or a surfactant and/or a further active ingredient and/or a further modulating ingredient. Optionally, activation 634 may be immediately after application 602 of the dry formulation and/or after a fixed waiting period. Alternatively or additionally, activation 634 may be at a certain time and/or interval related to the lifecycle of the pest being eradicated. Alternatively or additionally, activation 634 may be at a certain time and/or interval related to the lifestyle of the organism being protected.

In some embodiments, after the inactive formulation has been applied 602 an active form of the pesticide may be generated 604. For example, after activation 634 (for example wetting a formulation including Calcium formate and/or Citric acid) an active form may be generated 604 (for example formic acid may be generated 604). Optionally, the active form of pesticide may fumigate 606 a region and/or exterminate a pest. For example, the active ingredient may destroy pests in its active and/or aqueous form. Alternatively or additionally, an active form of an active ingredient may volatilize and/or destroy pests in a gas form. Optionally the active form may remain at concentration that destroys pests and/or is safe for a protected organism over a long and/or medium time. Optionally, the applied formula will continue to generate 604 the active form over a long and/or medium period of time. For example, the formulation may be applied 602 in a quantity that is large and/or reacts slowly to generate the active form over time. For example, there may be a step in the generation 604 of the active form which is rate limited. For example, the rate limited step may limit other steps of the reaction, for example due to equilibrium and/or thermodynamic considerations.

Figure 7:
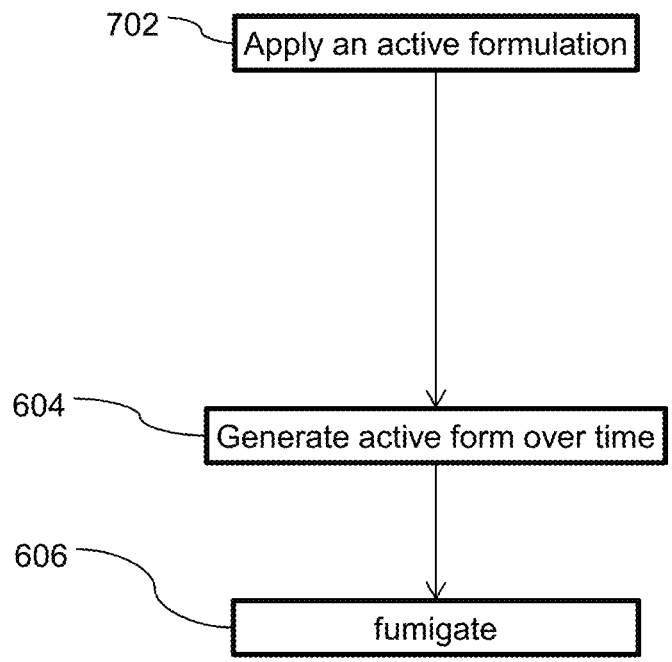

FIG. 7 is a flow chart illustration of a method of fumigating with an active formulation in accordance with the current invention. For example, in some embodiments an active form of the formulation may be supplied for example in a sealed container. Optionally, the active form is stable for example in a closed system and/or a closed container. Alternatively or additionally, the pesticide may be activated before use. Optionally, activation may include adding a material and/or energy (for example as described above). For example, in some embodiments, an inactive dry mixture including Calcium formate and/or Citric acid may be activated by dissolving the formulation in water. The resulting solution may be applied 702 for example to animals, people, living spaces, empty spaces etc. Optionally, over time the activated formulation generates 604 an active form of the pesticide destroys and/or fumigates 606 a pest (for example as described in various embodiments herein).

In some embodiments, activation may include adding a dry formulation to water at a concentration ranging between 1 to 2.5% of the active ingredient to the water on a weight by weight basis. Alternatively or additionally, the ratio of active ingredient to water may range between 0.1 to 1% and/or from 2.5 to 5% and/or from 5 to 10% and/or from 10 to 50% or more. Optionally the pesticide may be supplied and/or stored in an active and/or concentrated form. Optionally the liquid with the aqueous pesticide may be spread onto a living space and/or applied directly to an organism (for example a mammal and/or a plant) at a rate ranging between 50 to 100 $cc/m^2$ and/or 100 to 1,000 $cc/m^2$ and/or 1 to 50 $cc/m^2$.

It is expected that during the life of a patent maturing from this application many relevant pesticide molecules and/or application methodologies will be developed and the scope of the terms are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Tools and Methods for the Efficiency Test:

In order to test the efficacy of a pesticide formulation in accordance with an embodiment of the current invention, a formulation "Odin" was applied to reduce fleas on 26 goats. An inactive dry formulation included 34.5 g Calcium Formate and 50.8 g Citric Acid and 14.7 g Calcium Chloride pers 100 g. Thirteen goats from a were treated with "Odin" in a test goat pen (goat pen 1) and 13 additional control goats were kept in a control pen and not treated against fleas.

The goats were acclimatized for a month before the start of the experiment.

On day 0, Goat pen 1, was treated with 50 grams of "Odin", per square meter, one time (at the beginning of the test). After application of the dry formulation, the pen was wet with water at a rate of 100-200 cc/m².

Tests Performed:
   a. Qualitative test: to the presence of any fleas in the pen pad (in the vicinity of the goat's habitat).
   b. Quantitative test: counting the number of fleas on a square area of 10 cm2 on the back of the goat, 5 cm from the base of the tail.

Procedure:
   a. Qualitative Test:
   5 samples 844 of 5 grams of ground from each pen were collected every week from the beginning of the test, on day: 0 (before applying "Odin"), 7, 14 and 21 each sample 844 was placed in 70% ethanol and analyzed under microscope for the presence of fleas, in any life circle stage.

The presence of fleas in the pen pad may not give a good quantitative estimation for the flea's population size, because of the uneven distribution of fleas in the pad of pen. Nevertheless, the presence of fleas on the pad is a good indication of their ability to complete a life cycle and regain infestation after being exterminated from the host body, lack of fleas' stages in the pen pad is an indication for a successful extermination.

Figure 8:
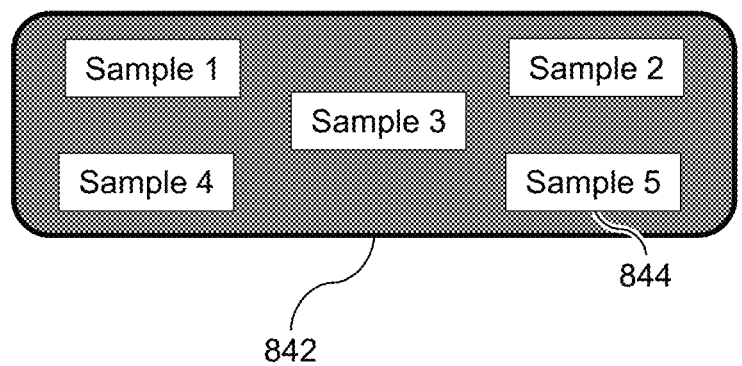

FIG. 8 illustrates a scheme for collecting samples 844 from a living space 842 of the goats (e.g. the pad).

b. Quantitative Test:
   The number of fleas on the goats' bodies was counted. In some cases, fleas move within the goat's hair. The flea population may be concentrated especially on the back of the goat, in the rear, near the base of the tail. Goats were sampled at 2 inches from the base of the tail, all the goats were tested at day: 0 (before applying "Odin") 7, 14 and 21 days after applying pesticide in the test pen 1 in accordance with embodiments of the current invention.

Results:
   a. Qualitative Test:
   The results are shown in table 1 for goat pen 1 (test with pesticide in accordance with some embodiments of the current invention), and in table 2 for goat pen 2 (control not treatment):

TABLE 1

(+ is for fleas' presence, − is for fleas' absence)

| Sample No. (Test) | Fleas presence over times | | | |
|---|---|---|---|---|
| | 0 days | 7 days | 14 days | 21 days |
| 1 | + | + | + | − |
| 2 | + | + | + | − |
| 3 | + | − | − | − |
| 4 | + | + | + | − |
| 5 | + | + | − | − |

TABLE 2

(+ is for fleas' presence, − is for fleas' absence)

| Sample No. (control) | Fleas presence over times | | | |
|---|---|---|---|---|
| | 0 days | 7 days | 14 days | 21 days |
| 1 | + | + | + | + |
| 2 | + | + | + | + |
| 3 | + | − | − | + |
| 4 | + | + | + | + |
| 5 | + | + | + | −+ | b. Quantitative Test:
   The results are shown in table 3 for goat pen 1 (test with pesticide in accordance with some embodiments of the current invention), and in table 4 for goat pen 2 (control not treatment):

TABLE 3

(number of fleas on each test goat at date)

| Goat No. | Number of fleas per goat | | | | Percentage change in number of fleas since the beginning of the test |
|---|---|---|---|---|---|
| | 0 | 7 | 14 | 21 | |
| 1 | 25 | 17 | 8 | 2 | −92% |
| 2 | 30 | 11 | 7 | 0 | −100% |
| 3 | 22 | 6 | 0 | 0 | −100% |
| 4 | 17 | 10 | 5 | 1 | −94.1% |
| 5 | 32 | 16 | 5 | 0 | −100% |
| 6 | 37 | 30 | 4 | 2 | −94.6% |
| 7 | 28 | 18 | 5 | 0 | −100% |
| 8 | 15 | 8 | 5 | 0 | −100% |
| 9 | 26 | 18 | 6 | 3 | −88.5% |
| 10 | 33 | 17 | 3 | 0 | −100% |
| 11 | 31 | 23 | 0 | 0 | −100% |
| 12 | 16 | 10 | 4 | 1 | −93.7% |
| 13 | 19 | 10 | 0 | 0 | −100% |
| Total average percentage change in flea's population | | | | | −97.14% |

TABLE 4

(number of fleas on each control goat at date)

| Goat No. | Number of fleas per goat | | | | Percentage change in number of fleas since the beginning of the test |
|---|---|---|---|---|---|
| | 0 | 7 | 14 | 21 | |
| 1 | 17 | 17 | 31 | 21 | +23% |
| 2 | 26 | 26 | 17 | 28 | +7.6% |
| 3 | 26 | 29 | 27 | 25 | −0.03% |
| 4 | 22 | 19 | 17 | 31 | +40.1% |
| 5 | 29 | 20 | 30 | 30 | +0.03 |
| 6 | 18 | 19 | 27 | 27 | +50% |
| 7 | 36 | 31 | 27 | 19 | −52.7% |
| 8 | 30 | 32 | 17 | 31 | +0.03% |
| 9 | 34 | 34 | 38 | 19 | −55.8% |

TABLE 4-continued (number of fleas on each control goat at date)

| Goat No. | Number of fleas per goat | | | | Percentage change in number of fleas since the beginning of the test |
|---|---|---|---|---|---|
| | 0 | 7 | 14 | 21 | |
| 10 | 33 | 23 | 27 | 38 | +15.1% |
| 11 | 18 | 29 | 33 | 28 | +55.5% |
| 12 | 25 | 31 | 34 | 23 | −0.08% |
| 13 | 24 | 25 | 33 | 30 | +25% |
| Total average percentage change in flea's population | | | | | +2.85% |

Figure 9:
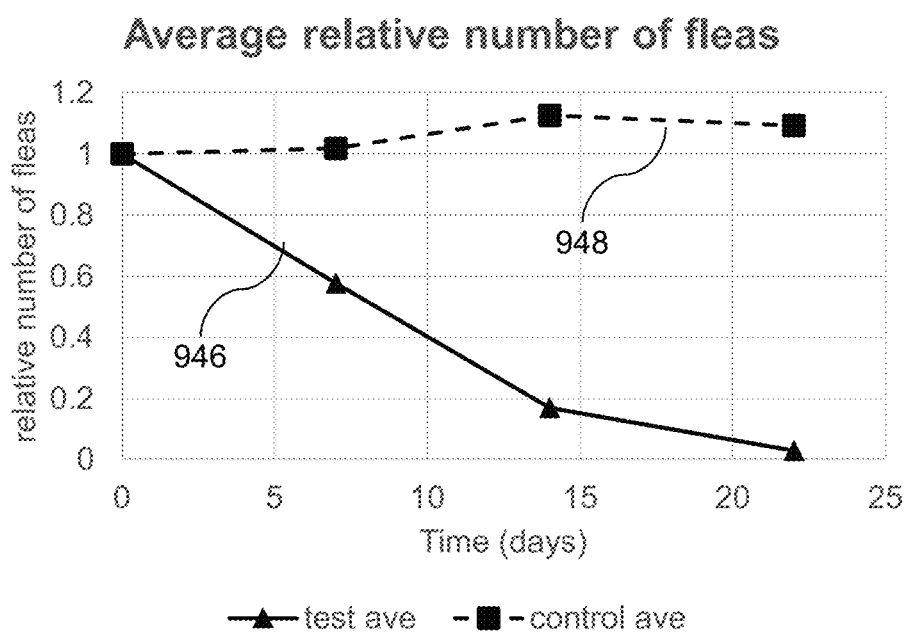

Summary of the Results:

According to the results, the test group showed a significant decrease in the size of the flea population, both on the body of the hosts and in their environment, compared to the control group which showed no significant difference in flea population during the test, nor on the goats and nor in the environment. FIG. 9 illustrates the relative elimination of fleas from the test group 946 and the control group 948

Discussion:

Without limiting the invention to theoretical explanations, the experiment indicates that disconnection of the flea's life cycle in the soil (for example by application of dry "Odin") leads to a gradual reduction in flea infestations on the host. Particularly only 5% of the flea's population are on the host, after applying "odin" on the pen pad. This indicates that the fleas that live on the pad, are eliminated. It is hypothesized that flea life cycle may include larvae eggs and/or pupae that live on the ground. When the forms that live on the ground died out in time, the parasite fleas that live on the host may be inhibited from reproducing and/or may be eliminated according to their life span. Additionally or alternatively, dissolving "Odin" in water and spraying it on the goats in addition to treating the pen, may eliminate the flea population faster.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A pesticide formulation comprising:
   a stable inert compound of an active ingredient configured for generating an active form that at an effective concentration that is safe for mammals over a medium term and
   a moderator compound that tends to drive said generating forward as said active form is depleted below said effective concentration;
   wherein said generating an active form produces a bi-product and wherein said moderator compound includes a component that tends to remove said bi-product from a system;
   wherein said moderator compound and said bi-product form a precipitate at a concentration of the pesticide formulation that generates an effective concentration of said active form; and
   wherein said active ingredient includes formate.

2. The pesticide formulation of claim 1, wherein said active form is volatile to form a vapor at an effective concentration that acts as a fumigant to destroy a pest and wherein said vapor is safe for human beings.

3. The pesticide formulation of claim 1, wherein said stable inert compound includes at least 10% by weight Calcium Formate.

4. The pesticide formulation of claim 1, wherein said moderator includes Citric acid at least 15% by weight of total pesticide formulation.

5. The pesticide formula of claim 4, wherein said stable inert compound includes at least 10% by weight Calcium Formate and wherein a molar ratio of said Citric acid to said Calcium Formate ranges between ½ to 2.

6. The pesticide formulation of claim 4, wherein said moderator includes at least 5% by weight Calcium Chloride.

7. The pesticide formula of claim 6, wherein said stable inert compound includes at least 10% by weight Calcium Formate and wherein a molar ratio of said Calcium Chloride to said Calcium Formate ranges between 15% to 100%.

8. The pesticide of claim 1, wherein said active form is an acid having a pH of between 3 and 7 at said effective concentration.

9. The pesticide formulation of claim 8, further comprising:
   boric acid at a weight ratio to said active form of between 1/10 to 10.

10. A pesticide formulation according to claim 1, wherein the formulation is configured as a disinfectant.

11. The pesticide formulation of claim 10, wherein the formulation is configured an antibacterial agent.

12. The pesticide formulation of claim 11, wherein the formulation is capable of disinfecting *Salmonella, Listeria* and *Bacillus* species.

13. A method for at least one of controlling pests and disinfection comprising:
   spreading a dry formulation including
      an active ingredient configured for generating an active form that at an effective concentration that is safe for mammals over a medium term and
      a moderator compound that tends to drive said generating forward as said active form is depleted below said effective concentration
   wherein said generating an active form produces a bi-product and
   wherein said moderator compound includes a component that tends to remove said bi-product from a system;
   wherein said moderator compound and said bi-product form a precipitate at a concentration of the dry formulation that generates an effective concentration of said active form;
   at a combined rate of 1 to 500 g/m$^2$ around at least one of a mammal, a mammal living space and a planted area; and
   wherein said active ingredient includes formate.

14. The method of claim 13, further comprising wetting said living space with water at a quantity of between 10 to 1,000 cc/m².

15. A method for at least one of controlling pests and disinfection comprising:
- adding an active ingredient configured for generating an active form that at an effective concentration that is safe for mammals over a medium term and a moderator compound that tends to drive said generating forward as said active form is depleted below said effective concentration to water at a concentration ranging between 1/10% to 10% of said active ingredient
  - wherein said generating an active form produces a bi-product and
  - wherein said moderator compound includes a component that tends to remove said bi-product from a system;
  - wherein said moderator compound and said bi-product form a precipitate at a concentration of the dry formulation that generates an effective concentration of said active form;
- and spreading onto at least one of a mammal, a mammal living space and a planted area; and
- wherein said active ingredient includes formate.

16. The method of claim 15, wherein said spreading is at a rate of between 1 to 1,000 cc/m².

* * * * *